April 4, 1972 G. P. KLEIN 3,654,117
ELECTRODE STENCIL FOR ANODIC PRINTING
Original Filed Nov. 14, 1966
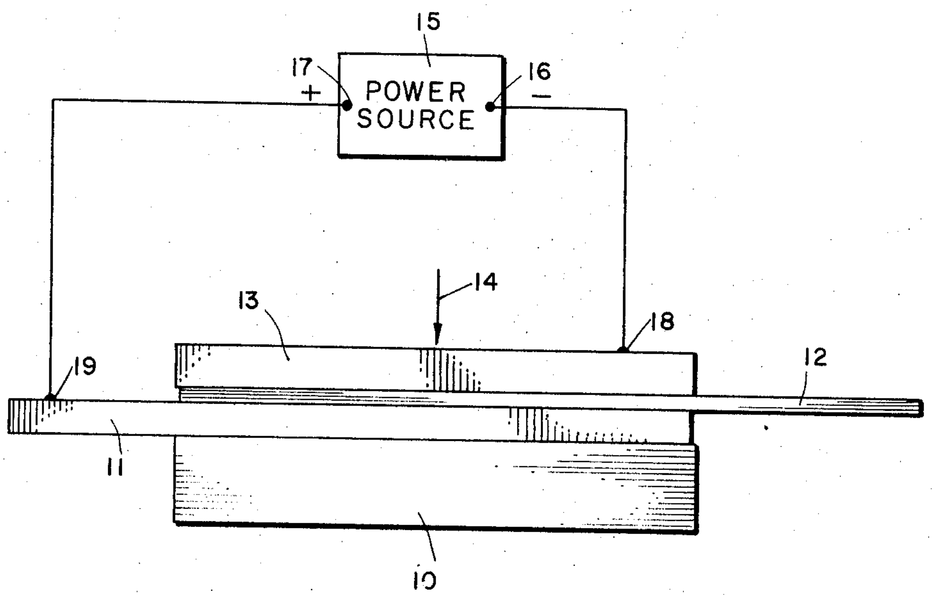
INVENTOR
GERHART P. KLEIN
BY
[signature]
ATTORNEY United States Patent Office 3,654,117
Patented Apr. 4, 1972

3,654,117

ELECTRODE STENCIL FOR ANODIC PRINTING

Gerhart P. Klein, Manchester, Mass., assignor to P. R. Mallory & Co. Inc., Indianapolis, Ind.

Continuation of application Ser. No. 594,123, Nov. 14, 1966. This application Oct. 7, 1969, Ser. No. 866,102
Int. Cl. C23b 5/76; B01k 3/06
U.S. Cl. 204—224 8 Claims

ABSTRACT OF THE DISCLOSURE

A printing system is provided comprising a film-forming metal stencil printing surface having an image formed on the surface that is electronically conductive. Means are provided for holding electro sensitive paper in contact with the printing surface, and a power source is utilized to provide current flow from the electrode stencil to the electrode means to develop the image on the sheet of photosensitive paper.

This application is a continuation of application Ser. No. 594,123 filed Nov. 14, 1966, now abandoned.

The present invention relates to printing processes and more particularly to the means and methods for providing an electro-stencil for use in combination with electrosensitive paper in a printing process.

The present invention utilizes the phenomenon that contaminates introduced into film-forming metals, either before or after the oxide film on the surface thereof is electro-formed, produce defects in the oxide film which are electronically conductive, whereas the defect free areas of the oxide film are electrically insulative or show only ionic conductivity in high voltage electrostatic fields. The term "defect" as used in this disclosure means electronic defect, that is, an electronically conductive area. It was found that an electro-stencil can be fabricated by intentionally forming a defect or a series of defects which correspond to an image in the oxide layer of the film-forming metal. The electro-stencil of the present invention is made by intentionally forming the image desired to be reproduced on an oxide free surface of the film-forming metal or on the oxide layer formed on the film-forming metal so that the image so formed is electronically conductive and so that the area surrounding the image is electronically nonconductive. Where initially oxide free film-forming metal is utilized, the formation of an insulating oxide film surrounding the image area establishes an area corresponding to the image on the surface of the film-forming metal which is highly conductive. Where a film-forming metal is used that already has an insulative film formed thereon, areas of electronic conductivity may be formed by several different methods such as for example: the outline of the image to be reproduced is superimposed on the oxide surface of a film-forming metal and the oxide film corresponding to the image is removed by etching, sandblasting or the like methods, thereafter, the oxide free surface of the metal which now corresponds to the image is treated so that the oxide free areas are electronically conductive; the outline of the image to be reproduced is superimposed on the oxide surface of a film-forming metal and the insulating oxide film is broken down electrically so as to make the image area electronically conductive; and, the outline of the image to be reproduced is superimposed on the oxide film surface of a film-forming metal, the oxide film is treated so as to form a thin layer of a suitable semiconductor oxide which will cause the insulating oxide film to become electronically conductive upon activation.

It should be noted that removal of the insulating oxide film would necessarily remove the electronically conductive areas carried by the film-forming metal. Thus, the image may be "erased" when its usefulness has terminated and the film-forming metal may be reprocessed and subsequently reused to reproduce another desired image. The oxide films are electro-formed on film-forming metals such as tantalum and niobium by using any of the known electro-formation methods and an electrolyte of an aqueous solution of a borate or boric acid, a citrate, succinate, a tartrate, or an oxalic, a sulfuric, a phosphoric and a chromic acid. Such metals are occasionally referred to as valve metals because the oxide films formed thereon have asymmetrical conductive characteristics.

The film-forming metals are noted for their high resistivity oxide films. The high resistivity oxide films can only be realized, however, when film-forming metals have a purity of about 99.9 percent. It was found that heterogenities present in the oxide film will, in general, disrupt the uniformity of the dielectric or insulating characteristics of the oxide film and, as a result, the oxide film has inferior electrical properties. The non-uniformity of the dielectric and insulating characteristics caused by defects and heterogenities in oxide films is exhibited by electrical conductivity in the areas of the non-uniformity. The presence of electronic conductivity can be detected by an electro-sensitive paper. It was found that the electrical conductivity of oxide films on film-forming metals such as tantalum and niobium may be conveniently ascertained using a sheet having an iodide-starch redox indicator in a solidified electrolyte dispersed thereon so as to "print" a defect area or areas on the paper. This type of paper is generally referred to as electro-sensitive paper. The electro-sensitive paper is placed in abutting relationship with the oxide film and current is passed through the film in the non-uniform or defective areas. The passage of current in the defective areas oxidizes the iodide which, upon reacting with the starch, forms a blue or a black coloration corresponding to the defective area on the electro-sensitive paper.

Electro-sensitive papers of a different kind are responsive to metal ions rather than electrons. Commercially available ALFAX paper is an example of a paper sensitive to metallic ions. The stencil concept disclosed herein could be used in conjunction with papers of this category. Instead of developing an image which is electronically conductive, one can use a metal that produces ions when an electrical current flows therethrough, which in turn will reproduce the desired image on the metallic ion sensitive paper. The metals may also be deposited by vacuum evaporation or electroplating using suitable known techniques.

In accordance with the present invention, defects in oxide films electro-formed on film forming metals may be introduced in a number of ways either before or after the oxide film is electro-formed. For example, direct scratching or "writing" on an oxide free surface of metal with materials such as carbon, platinum, palladium and the like, which adhere sufficiently to the film-forming metal, prevent oxidation of the film-forming metal where the aforemenioned materials adhere thereto during electro-formation of the oxide film. The "writing free" areas of the film-forming metal will grow, however, an oxide film when subjected to an electro-formation process. The "writings" are fashioned so as to correspond to the image to be reproduced and hence provide an electro-stencil. Also, direct "writing" on the film-forming metal with a material such as nickel, iron, lead and the like, which adheres to the film-forming metal and reacts during the electro-formation process, provides a stencil which is electronically conductive in "writing" areas.

Direct "writing" on the oxide free surface of the film-forming metal or the oxide film on the film-forming metal requires that the "ink" adheres well to both of the surfaces for the "ink" was found to have a tendency to detach from the surface of the metal or the oxide film, as the case may be, during printing. Adhesion can be improved by writing on matte surfaces which can be obtained by sandblasting, etching and similar treatments. However, sandblasting by itself introduces defects into the oxide film which may be electronically conductive so that one must use the sandblasting technique judiciously. It was found that carbon blasting is particularly effective in producing defective areas in the oxide film.

In order to provide a more permanent stencil, contaminates are alloyed with the film-forming metal. In this instance, the contaminates, and hence the defects, are permanently present in the film-forming metal. The alloying can be done by heating the stencil in an argon atmosphere or in a vacuum atmosphere at about 1100–1400° C. for about 5 to 60 minutes.

The impurities can be deposited on the surface of the stencil by a number of methods such as by vapor deposition, electroplating, and the like.

An inert metal such as platinum and the like or carbon deposited in predetermined areas on an oxide film will cause the film to break down on application of the electro-formation voltage to provide defects in the oxide film. In this way the oxide film can be broken down while, at the same time, the area where the film is broken down is made conducting by deposition of electronically conductive materials.

Certain metal oxides, such as tantalum oxide and niobium oxide and like metal oxides, can be removed by applying hydrofluoric acid and fluorides. When desired area of the metal oxide is removed by applying hydrofluoric acid, an oxide free film-forming metal area is exposed. In order to substantially prevent oxidation of the electronically conductive area or areas during the printing process and to provide a suitably conductive area, the oxide free area is coated with a suitable material such as colloidal graphite, manganese dioxide, nickel oxide and the like that prevent the oxide free areas from renewing formation of the oxide in those areas and make those areas more electronically conductive. The aforementioned material must adhere to the film-forming metal. Thus, a stencil can be produced by the application of fluorides and hydrofluoric acid in predetermined areas of an oxide layer found on a tantalum or niobium base. The oxide-free area is maintained oxide free and electronically conductive during the printing process by coating said areas with a suitable material.

It has also been found that defects in the oxide films can be amplified by treatment after the defects are established. For example, an oxide film formed on a film-forming metal by electro-formation and which has been marked by blasting or writing as previously described can be treated as follows: The metal having an oxide film formed thereon is dipped in dilute aqueous solution of manganese nitrate containing a suitable wetting agent and then placed in a furnace to pyrolytically convert the manganese nitrate coating to manganese dioxide. The metal with the oxide film and manganese dioxide coating thereon is then reanodized at a voltage below the original formation voltage of about 50 to 150 volts but of sufficient magnitude to activate the purposely introduced defects covered with manganese dioxide. The defects treated in above disclosed manner shows strong activity and are active well below the formation voltage of the defect free oxide film.

A reversible and therefore reusable stencil can be produced in the following way: the electrical conductivity of particular areas of the oxide film on the film-forming metal can be generated reversibly by depositing oxide layers of manganese, iron, nickel, lead, and the like metals by one of several methods, such as by pyrolysis of metal nitrates, reactive sputtering, or vapor deposition of metals followed by thermal oxidation. Following the deposition of the activating, oxide film on the surface of the film-forming metal is rendered electronically conductive by reanodization of the oxide film at a voltage which approximates the original formation voltage.

The electrical conductivity of the oxide film can be made to revert to its original non-conducting state by dissolving the previously deposited activating oxide film in suitable chemical solutions, such as for example, hydrochloric acid, which dissolves the manganese dioxide layer Good results were obtained with anodic oxide films electroformed on foils and sheets of tantalum and niobium using the aforementioned electrolytes and a formation voltage of about 50 to 150 volts. It should be noted that the reversible stencil permits the "erasing" of undesirable images and the reuse of the base metal for reproduction of other desired images.

An electro-stencil produced by the method of the present invention has several advantages. One of the advantages is that the oxide film is integrally attached to the film-forming metal and therefore does not deteriorate or become misaligned with the metal surface. In the case of tantalum oxide and niobium oxide, the oxide is chemically inert except with regard to hydrofluoric acid and fluorides. This fact permits removal of the oixde film in predetermined areas with a hydrofluoric acid etchant as well as use in conjunction with electro-sensitive paper having other chemicals thereon. Another advantage is the development of electronic conductivity in determined areas of the oxide film by intentionally introducing contaminates into the oxide film which in turn develop defects in the oxide film allowing a graduation of electronic conductivity. It would be much more difficult, if not impossible, to get the same graduation of electronic conductivity by depositing on the metal an insulating layer of varying conductivity. A further advantage of the present invention is that several methods may be used to produce defects in the oxide film. A variety of properties are obtained because of the difference in characteristics of these defects, depending upon the method of preparation. It should be noted that stencils produced in accordance with the present invention can be used over and over again without deterioration. It should also be seen that the combination of an electro-stencil, produced as disclosed hereinabove, electro-sensitive paper, and means for applying current to the stencil and electro-sensitive paper is simple, inexpensive, and easy to use.

Therefore, it is an object of the present invention to provide a printing system having an electro-stencil fabricated from a film-forming metal for printing desired images on suitable paper.

Another object of the present invention is to provide a novel stencil for use in conjunction with electro-sensitive paper in a printing process.

A further object of the present invention is to provide an electro-stencil produced by introducing contaminates into determined areas of an oxide film electro-formed on film-forming metal so as to develop defects in the oxide film, the stencil being used in conjunction with a power source for printing an image corresponding to the area or areas of defect in the oxide film on the electro-sensitive paper.

Yet still another object of the present invetnion is to provide an anodic printing system which utilizes an electro-stencil for printing on electro-sensitive paper.

Still another object of the present invention is to provide an electro-stencil by intentionally introducing defects in predetermined areas of an oxide film on film-forming metals.

Yet another object of the present invention is to provide an electro-stencil having intentionally formed areas in an oxide film which are electronically conductive, the remainder of said stencils being in the form of an electronically insulative material.

Another object of the present invention is to provide a method for removing a metal oxide film on a film-forming metal piece, thereby producing an electro-stencil having electrical conductivity in the areas where the oxide film is removed.

A further object of the present invention is to provide a printing system having electro-stencil fabricated from a film-forming metal having an image formed on a surface thereof, the image being an electronically conductive area and the balance of said printing surface consisting of an insulating oxide film formed thereon, electrode means retaining a sheet of electro-sensitive paper in intimate contact with said printing surface of said electro-stencil and a power souce having one terminal connected to said electro-stencil and another terminal connected to said electrode means retaining the sheet of electro-sensitive paper.

The present invention, in another of its aspects, relates to novel features of the instrumentalities described herein for teaching the principal object of the invention and the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

The drawing shows a printing system utilizing the electrostencil of the present invention.

Generally speaking, the present invention relates to a printing means comprising an electro-stencil fabricated from a film-forming metal, electrode means retaining electro-sensitive paper in engagement with the printing surface of the electro-stencil, and means for providing current flow from said electro-stencil to said electrode means. An image is formed in the printing surface of the electro-stencil. The image is in the form of electronically conductive areas surrounded by insulative areas of oxide film. In a specific embodiment, the image is in the form of substantially oxide free electronically conductive areas surrounded by insulative areas comprised substantially of an oxide film.

Referring now to the drawing, a printing means utilizing the electro-stencil of the present invention will be discussed. A support means 10 includes surface for supporting an electro-stencil 11 fabricated from any suitable film-forming metal. A sheet of suitable electro-sensitive paper 12 is placed in intimate contact with the electro-stencil 11 and retained in intimate contact therewith by electrode plate 13. A predetermined amount of pressure is applied to the electro-sensitive paper 12 in the direction of the arrow 14. The pressure may be external or the sheer weight of the electrode plate 13 may be advantageously utilized.

The electro-sensitive paper 12 is a sheet of paper having an iodide-starch redox indicator in a solid electrolyte dispersed thereon. Passage of current through the paper oxidizes the iodide which upon reaction with the starch forms a black or blue coloration on the paper.

A power supply 15 has a pair of output terminals 16 and 17 which supply current to the printing system. The terminal 16 of the power supply is connected to terminal 18 carried by the eelctrode plate 13 through a suitable electrical conduit means such as copper wire or the like and the terminal 17 of the power supply is connected to terminal 19 carried by the electro-stencil through a suitable eelctrical conduit.

It is seen that terminal 17 has a positive polarity and that terminal 16 has a negative polarity, therefore, current flows from the electro-stencil 11 through the electro-sensitive paper 12 to the electrode plate 13 through electronically conductive areas on the uppermost surface of the electro-stencil 11. Since the electronically conductive areas of the electro-stencil correspond to the desired image, current flow through the conductive areas of the stencil will accurately reproduce the image of the stencil on the electro-sensitive paper 12. It was found that about 1 to 5 volts were sufficient to cause printing of the image on the paper 12.

The electro-stencil of the present invention can, for some printing application, be made from a relatively thin and inexpensive film-forming metal foil. When film-forming metal foil is used, some special precautions are desirable since the surface thereof is likely to be contaminated with materials which may effect the image reproduction during the rolling processes and general handling to which the foil is subjected. As stated hereinbefore, the oxide films grown on films-forming metals, such as tantalum, aluminum, niobium, titanium and zirconium are good insulators as long as the metal used has a purity of about 99.9 percent and the purity of the surface corresponds to the bulk purity. It is necessary, therefore, to prepare the surface of the foil in such a manner as to eliminate all possible defects in the oxide film. This may be done by chemical or electro-chemical polishing or by heat-vacuum treatment or by a combination of these processes and treatments.

It has been found that the film-forming metals of tantalum and niobium are particularly well suited for use as an electro-stencil. These metals, when subjected to a suitable electro-formation method, form oxide films on the surfaces when the surfaces are covered with any suitable electrolyte, such as an aqueous solution of a borate or boric acid, a citrate, succinate, a tartraate, or acids such as oxalic, sulfuric, phosphoric and chromic.

Defects may be intenionally introduced in the oxide film as previously disclosed hereinbefore. The reason for introducing defects is to develop electronically conductive areas in the oxide film of the film-forming metal. The conduction mechanism in defects in oxide films is not thoroughly understood, however, it has been found that most slight defects, or defects which are not intentionally introduced into the oxide film, exhibit a current-field characteristic similar to that of the ionic growth which is an exponential one of the general form $I=Ae^{BE}$ where I is the current density, E is the field strength, and A and B are constants.

With slight defects, ionic and electronic currents become appreciable at about the same field strengths. Thus, with slight defects, there are electronic ionic currents present in the system, the latter having the effect of shunting the electronic current so that it does not reach breakdown values. This stabilizing effect is, however, undesirable because it teaches that electronic currents are always accompanied by ionic currents and, consequently, film growth on the surface of the film-forming metal. If film growth is present, successive prints from the stencil have to be taken at successively higher voltages. Since it is desirable to print at constant voltages, deep defects, ones that show electronic conduction well below the fields necessary for appreciable ionic conduction, are more suitable for printing on electro-sensitive paper.

A method has been devised for ascertaining the relative electronic conductivity of oxide films grown on the surface of film-forming metals. The method, which is a printing process, may be used to ascertain the printing effectiveness of the electro-stencils of the present invention. In this method, the subject film-forming metal having an electro-formed oxide film thereon is sandwiched with a paper which has been soaked in a suitable indicator solution such as starch-iodide and agar-agar and dried partially. The sandwich thus formed is compressed between two electrode plates so as to make perfect electrolytic contact between the oxide surface and the moist indicating paper acting as an electrolyte. Current is passed through the sandwich from the metal which has been anodized to the electrode plate holding the paper. The passage of current through the sandwich as described will result in discoloration of the paper at locations where there is electronic conduction in the anodic oxide film. These discolorations are indicative of whether or not the defects are deep enough to provide good images for given printing voltages.

Examples 1 to 3 are illustrative of the preparation of film-forming metal sheets used in the printing process of the present invention.

EXAMPLE 1

The tantalum sheet of about 99.9 percent purity is cleaned so that no defects are observed upon subjecting the sheet to the above-disclosed printing test. A layer of photo-resist was uniformly deposited over the surface of the tantalum sheet which was to have the image formed thereon. An image was exposed on the photo-resist using well known photographic techniques and said image was developed on the sheet. After the development of the image on the sheet, carbon was deposited by vacuum evaporation over the developed image. In addition, sheets were prepared by the spraying of colloidal graphite, by evaporating nickel and by evaporating iron over the developed image on the tantalum sheet. After the deposition of carbon onto the tantalum sheet was completed, the photo-resist was removed so as to leave a carbon image on the tantalum sheet. With regard to the sheets using graphite, nickel or iron, the photo-resit was removed to leave a graphite image, an iron image, or a nickel image, as the case may be. In each instance, the sheet was heat treated 1400° C. in argon atmosphere for 5 minutes in order to effect alloying of the deposited material with the tantalum and provide a stencil. Stencils were also produced by subjecting the aforementioned sheets to a heat treatment step wherein the treatment comprises placing the sheets in a vacuum atmosphere at 1100° C. for 60 minutes. The printing of the image formed on the tantalum sheet on the electro-sensitive paper was carried out using voltages of 1, 2, 3, 4 and 5 volts. Another stencil was prepared from a niobium sheet using similar procedures.

EXAMPLE 2

A tantalum sheet of about 99.9 percent purity was cleaned and an anodic film was formed by electro-formation at about 100 volts. A photo-resist pattern was laid down over the oxide film. A layer of reactively sputtered iron oxide was deposited over the masked tantalum oxide. The photo-resist was removed to leave an iron oxide deposit on the tantalum oxide in the form of the desired image. The printing of the image formed on the tantalum sheet on the electro-sensitive paper was carried out using the printing structure shown in FIG. 1 at voltages of 1, 2, 3, 4 and 5 volts. In addition, another stencil was prepared from a niobium sheet using the aforementioned procedure.

EXAMPLE 3

A tantalum sheet of about 99.9 percent purity was cleaned and an anodic oxide film was grown thereon by electro-formation at about 100 volts. The electrolyte used for anodizing the tantalum may be any of several known electrodes used for such a purpose. In this example a phosphoric acid electrolyte was used. A layer of photo-resist was uniformly deposited over the surface which was to have the desired image formed thereon. The desired image was exposed on the photo-resist using well known photographic techniques and was developed using said well known techniques. After developing, the oxide film in the area corresponding to the image was removed in an etchant tank while the balance of the area was rendered impervious to the etchant by the photo-resist. Hydrofluoric acid was used as an etchant for tantalum oxide film. After the etching operation, the photo-resist was removed to leave an oxide free image formed in an oxide layer on tantalum. The base areas were covered with colloidal graphite, nickel paint, or the like. The printing of the image formed on the tantalum sheet on the electro-sensitive paper was carried out using the printing structure shown in FIG. 1 at voltages of 1, 2, 3, 4 and 5 volts. Individual stencils were prepared from aluminum, niobium, titanium and zirconium using the aforementioned procedure.

The fact that a graduated electronic conductivity can be produced in an oxide film will permit the printing of a variety of images, especially images having light and dark areas, shading, and the like.

The printing system of the present invention, as hereinbefore described, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. A printing system comprising: a metal electro-stencil having a printing surface of film forming metal selected from tantalum and niobium and having an electro-formed oxide film on said printing surface and having an image formed on said printing surface as an oxide free area that is electronically conductive, surrounded by insulative areas; electrode means for holding electro-sensitive paper in intimate contact with said printing surface of said electro-stencil; a power source for providing current flow from said electro-stencil to said electrode means so as to develop said image on a sheet of electro-sensitive paper held therebetween; the negative terminal of said power supply is connected to said electrode means and the positive terminal of said power supply is connected to said electro-stencil.

2. A printing system as in claim 1 wherein said image is formed in said film, said image being in the form of electronically conductive areas intentionally introduced in a pre-arranged pattern on said coating.

3. A printing system as in claim 1 wherein said sheet of electro-sensitive paper has an iodide-starch redox indicator in a solidified electrolyte dispersed thereon and said power source provides current flow through predetermined areas of said electro-sensitive paper so as to oxidize said iodide so as to react with said starch thereby producing discoloration in said predetermined areas.

4. A printing system as in claim 1 wherein said electro-stencil is a sheet of said film-forming metal having an image directly drawn on said printing surface with a material selected from nickel, iron, carbon, lead, platinum and palladium which will react in electro-formation of said film-forming metal to produce an electronically conductive material and an oxide film grown over said printing surface so as to cover said image.

5. A printing system as in claim 1 wherein said electrostencil is a sheet of thin film-forming metal foil having an anodically grown oxide film on said printing surface and said image is formed on said printing surface as a substantially oxide free area.

6. A printing system as in claim 1 wherein said electrode means for holding electro-sensitive paper is a substantially flat metal plate.

7. A printing system as in claim 6 wherein said printing surface of said metal electro-stencil is substantially flat.

8. A printing system as in claim 1 wherein said image is formed of purposely introduced defects in predetermined areas surrounded by an insulating oxide electroformed on said printing surface.

References Cited

UNITED STATES PATENTS

| | | | |
|---|---|---|---|
| 2,305,990 | 12/1942 | Prest | 204—18 |
| 1,970,804 | 8/1934 | Kerk | 204—290 X |
| 2,267,901 | 12/1941 | Duncan | 204—2 |
| 2,173,141 | 9/1939 | Talmey | 204—2 |
| 2,971,810 | 2/1961 | Ressler | 204—224 X |

JOHN H. MACK, Primary Examiner

D. R. VALENTINE, Assistant Examiner

U.S. Cl. X.R.

204—2, 15, 18, 132, 290 F; 346—74 E